UNITED STATES PATENT OFFICE.

LAMBERT THORP, OF DETROIT, MICHIGAN.

HYPNOTIC BODIES.

1,237,413. Specification of Letters Patent. Patented Aug. 21, 1917.

No Drawing. Application filed February 28, 1917. Serial No. 151,553.

*To all whom it may concern:*

Be it known that I, LAMBERT THORP, a citizen of the United States of America, residing at Detroit, in the county of Wayne and State of Michigan, have invented certain new and useful Improvements in Hypnotic Bodies, of which the following is a specification.

My invention relates to the production of a new series of bodies, and aims to provide a substance which, while possessing well-pronounced sedative and hypnotic properties, is of very low toxicity.

I have found that the series of compounds to which the general name, alpha-bromoisovalerianylurethane, may be applied, is possessed of well-pronounced sedative and hypnotic properties and is of very low toxicity.

The new series of compounds may be represented by the general formula:

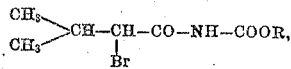

wherein R stands for any alkyl or substituted alkyl group.

I have found that the compounds of the new series, namely, the alpha-bromoisovalerianylurethanes may be obtained by the action of alpha-bromoisovalerianyl chlorid upon urethanes. The compounds, thus obtained, hitherto unknown, are valuable for medicinal purposes as sedatives and hypnotics.

The alpha-bromoisovalerianylurethanes are colorless, crystalline compounds, very slightly soluble in water; more readily soluble in alcohol or ether; easily soluble in cold solutions of the caustic alkalis, from which solutions they are precipitated unchanged by the addition of a mineral acid. When boiled with a solution of a alkaline hydroxid the alpha-bromoisovalerianylurethanes are decomposed with evolution of ammonia, while the bromin remains in solution as an alkaline bromid. The new compounds are possessed of a mildly bitter taste, and display sedative and hypnotic powers.

To prepare the said new alpha-bromoisovalerianylurethanes by the method wherein the chemical change involved may be expressed by the equation:

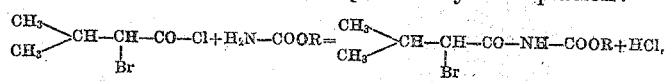

the process may be carried out, for instance, as follows:—

Two parts, by weight, of alpha-bromoisovalerianyl chlorid are mixed with one part, by weight, of ethyl urethane (amidoformic ethyl ester), and the mixture then heated in a suitable bath to a temperature of 100–120° C. for several hours. When hydrogen chlorid ceases to be evolved, the product of the reaction is cooled, and then recrystallized from dilute alcohol. The new substance, namely, alpha-bromoisovalerianyl ethyl urethane, of the formula,

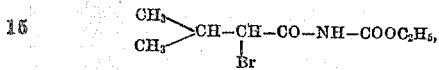

crystallizes in the form of colorless needles, melting at 114° C.

In an analogous or different manner other alpha-bromoisovalerianylurethanes may be obtained.

What I claim as my invention is:

1. As new products, the alpha-bromoisovalerianylurethanes, being colorless, crystalline compounds, very slightly soluble in water; more readily soluble in alcohol or ether; easily soluble in cold solutions of the caustic alkalis, from which solutions they are precipitated unchanged by the addition of a mineral acid; decomposed when boiled with a solution of an alkaline hydroxid, with formation of ammonia and an alkaline bromid; possessed of a mildly bitter taste, and displaying sedative and hypnotic powers.

2. As a new product, alpha-bromoisovalerianyl ethyl urethane, being a colorless, crystalline compound, melting at 114° C., very slightly soluble in water; more readily soluble in alcohol or ether; easily soluble in a cold solution of potassium hydroxid, from which solution it is precipitated unchanged by the addition of hydrochloric acid; decomposed, when boiled with a solution of potassium hydroxid, with formation of ammonia and potassium bromid; possessed of a mildly bitter taste, and displaying sedative and hypnotic powers.

In testimony whereof I affix my signature.

LAMBERT THORP.